United States Patent
Mehra et al.

(10) Patent No.: US 12,314,104 B2
(45) Date of Patent: May 27, 2025

(54) ENERGY MANAGEMENT FOR COMPUTING SYSTEMS

(71) Applicant: Accenture Global Solutions Limited, Dublin (IE)

(72) Inventors: Rohit Mehra, Delhi (IN); Priyavanshi Pathania, Chandigarh (IN); Vibhu Saujanya Sharma, Bangalore (IN); Vikrant Kaulgud, Pune (IN); Samarth Sikand, Jaipur (IN); Adam Patten Burden, Tampa, FL (US); Sanjay Podder, Thane (IN); Raghotham M Rao, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 63 days.

(21) Appl. No.: 18/314,475

(22) Filed: May 9, 2023

(65) Prior Publication Data
US 2024/0377871 A1    Nov. 14, 2024

(51) Int. Cl.
*G06F 1/26* (2006.01)
*G06Q 30/0601* (2023.01)

(52) U.S. Cl.
CPC ........... *G06F 1/26* (2013.01); *G06Q 30/0601* (2013.01)

(58) Field of Classification Search
CPC ............................. G06F 1/26; G06Q 30/0601
See application file for complete search history.

(56) References Cited

U.S. PATENT DOCUMENTS

| | | | |
|---|---|---|---|
| 10,789,083 B2 * | 9/2020 | Kim | G06F 9/45558 |
| 2012/0167109 A1 * | 6/2012 | Muralidhar | G06F 9/5094 713/340 |
| 2016/0209900 A1 * | 7/2016 | Blayvas | G06F 1/3228 |
| 2020/0133707 A1 * | 4/2020 | Coster | G06F 1/329 |

* cited by examiner

*Primary Examiner* — Terrell S Johnson
(74) *Attorney, Agent, or Firm* — Polsinelli PC

(57) ABSTRACT

In some implementations, a device may receive first energy consumption information relating to a set of hardware components of a computing system. The device may receive second energy consumption information relating to a set of virtual machines associated with the computing system. The device may receive third energy consumption information relating to a set of software elements associated with the computing system. The device may determine an energy consumption of the computing system based on the first energy consumption information, the second energy consumption information, and the third energy consumption information. The device may identify, based on the energy consumption of the computing system, an energy optimization associated with a usage context of the computing system. The device may transmit a set of instructions to alter one or more parameters of the computing system to implement the energy optimization for the computing system.

20 Claims, 11 Drawing Sheets

ENERGY MANAGEMENT FOR COMPUTING SYSTEMS

BACKGROUND

Data centers and other computing facilities, such as cloud computing environments, have become more widespread across a variety of industries. Data centers are used for storing, processing, and/or managing large amounts of data generated by businesses, governments, and/or individuals. The rapid growth of data centers has led to a significant increase in energy consumption. For example, data centers consume vast amounts of energy due to power servers, cooling systems, networking devices, and other components used to keep data centers operational. Other computing systems, such as cloud computing systems, may have similar components with large energy consumption requirements.

The high energy consumption of data centers has led to several environmental and economic concerns. For example, data centers may be responsible for significant amounts of greenhouse gas emissions, resulting in a significant carbon footprint for the businesses, governments, and/or individuals that manage the data centers. Furthermore, the cost of energy for operating data centers can be substantial and, as data centers continue to grow in size and complexity, an amount of energy that data centers consume is expected to increase significantly.

SUMMARY

Some implementations described herein relate to a method. The method may include receiving, by a device, first energy consumption information associated with a computing system, the first energy consumption information relating to a set of hardware components of the computing system. The method may include receiving, by the device, second energy consumption information associated with the computing system, the second energy consumption information relating to a set of virtual machines associated with the computing system. The method may include receiving, by the device, third energy consumption information associated with the computing system, the third energy consumption information relating to a set of software elements associated with the computing system. The method may include determining, by the device, an energy consumption of the computing system based on the first energy consumption information, the second energy consumption information, and the third energy consumption information. The method may include identifying, by the device and based on the energy consumption of the computing system, an energy optimization associated with a usage context of the computing system. The method may include transmitting, by the device, a set of instructions to alter one or more parameters of the computing system to implement the energy optimization for the computing system.

Some implementations described herein relate to a device. The device may include one or more memories and one or more processors coupled to the one or more memories. The one or more processors may be configured to receive first energy consumption information associated with a computing system, the first energy consumption information relating to a set of hardware components of the computing system. The one or more processors may be configured to receive second energy consumption information associated with the computing system, the second energy consumption information relating to a set of virtual machines associated with the computing system. The one or more processors may be configured to receive third energy consumption information associated with the computing system, the third energy consumption information relating to a set of software elements associated with the computing system. The one or more processors may be configured to determine an energy consumption of the computing system based on the first energy consumption information, the second energy consumption information, and the third energy consumption information. The one or more processors may be configured to receive a request to select a particular computing system, from a plurality of candidate computing systems, for a computing task. The one or more processors may be configured to select the computing system, from the plurality of candidate computing systems, as the particular computing system for the computing task based on the energy consumption. The one or more processors may be configured to transmit information identifying the selection of the computing system.

Some implementations described herein relate to a non-transitory computer-readable medium that stores a set of instructions. The set of instructions, when executed by one or more processors of a device, may cause the device to receive first energy consumption information associated with a computing system, the first energy consumption information relating to a set of hardware components of the computing system. The set of instructions, when executed by one or more processors of the device, may cause the device to receive second energy consumption information associated with the computing system, the second energy consumption information relating to a set of virtual machines associated with the computing system. The set of instructions, when executed by one or more processors of the device, may cause the device to receive third energy consumption information associated with the computing system, the third energy consumption information relating to a set of software elements associated with the computing system. The set of instructions, when executed by one or more processors of the device, may cause the device to determine an energy consumption of the computing system based on the first energy consumption information, the second energy consumption information, and the third energy consumption information. The set of instructions, when executed by one or more processors of the device, may cause the device to identify a usage context of the computing system. The set of instructions, when executed by one or more processors of the device, may cause the device to identify, based on the energy consumption of the computing system, an energy optimization associated with the usage context of the computing system. The set of instructions, when executed by one or more processors of the device, may cause the device to transmit a set of instructions to alter one or more parameters of the computing system to implement the energy optimization for the computing system.

DETAILED DESCRIPTION

Figure 1A:
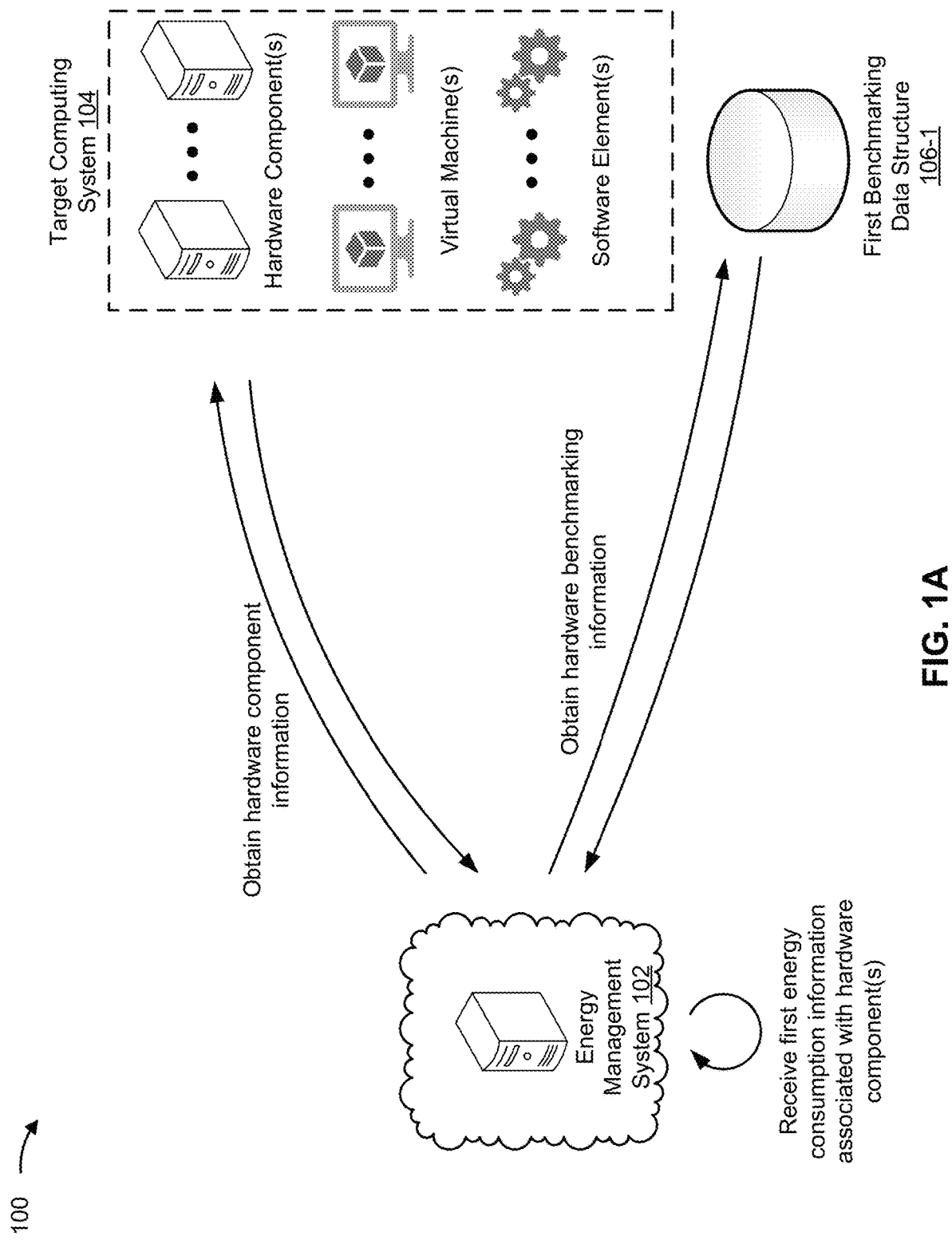
FIGS. 1A-1G are diagrams of an example implementation associated with energy management for computing systems.

The following detailed description of example implementations refers to the accompanying drawings. The same reference numbers in different drawings may identify the same or similar elements.

Various techniques have been developed to address issues in energy consumption in computing systems, such as data centers, cloud computing systems, decentralized ledger computations (e.g., crypto-currency mining), among other examples. For example, computing systems can be connected to electrical grids that use renewable energy sources, can have high-efficiency cooling systems installed, can have energy-efficient hardware, can repurpose generated heat (e.g., for use in building heating), can have different sets of parameters (e.g., processing parameters) configured, and/or can schedule tasks for off-peak energy utilization periods. Accordingly, usage of different computing systems for different tasks and/or usage of a single computing system with different parameters can result in different energy consumptions and/or associated carbon footprints. However, assessment of computing system energy utilization may be inaccurate as a result of differences in operating scenarios. For example, computing systems may generate millions or billions of different data points, some of which may correlate with energy consumption, from hundreds, thousands, or millions of different possible configurations of computing system selection or configuration.

Some implementations described herein enable assessment and management of computing system energy consumption. For example, an energy management platform may determine energy consumption information associated with hardware components, virtual machines, and/or software elements of a computing system, and may use the energy consumption information to determine an energy consumption of a computing system in connection with different possible configurations. Based at least in part on determining the energy consumption, the energy management platform may identify an energy optimization associated with a usage context of the computing system, such as a type of computing task that is to be performed by the computing system, among other examples. In this way, the energy management platform provides more accurate information assessing energy consumption by a computing system, which improves configuration of a data center (e.g., by enabling more accurate estimation of electrical requirements for the data center), budgeting for computing tasks (e.g., by enabling optimization of task execution to minimize electrical cost), siting of data centers (e.g., by identifying relative carbon footprints of different siting options), and/or environmental friendliness of a computing system (e.g., by optimizing electrical utilization by a computing system).

FIGS. 1A-1G are diagrams of an example implementation 100 associated with energy management for computing systems. As shown in FIGS. 1A-1G, example implementation 100 includes an energy management system 102, a target computing system 104, a set of benchmarking data structures 106, and a client device 108. These devices are described in more detail below in connection with FIG. 3 and FIG. 4.

As shown in FIG. 1A, the energy management system 102 may receive first energy consumption information associated with a set of hardware components of the target computing system 104. For example, the energy management system 102 may obtain hardware component information from the target computing system 104 and/or hardware benchmarking information from a first benchmarking data structure 106-1. The hardware component information may include information identifying a set of hardware components of the target computing system 104 and/or a set of parameters or configurations thereof. The hardware benchmarking information may include information regarding the set of hardware components, such as an energy consumption of a hardware component, a quantity of virtual machines that can be supported by a hardware component, or a type of computing task that can be executed by a hardware component, among other examples. As an example, types of computing tasks that may have different energy consumptions for hardware associated therewith include blockchain tasks, token mining tasks, streaming video tasks, data center processing tasks, or parallel computing tasks, among other examples.

Some examples of first energy consumption information (e.g., hardware benchmarking information or hardware component information) may include information identifying a hardware vendor, a model, a form factor, a central processing unit (CPU) name, a CPU characteristic, a CPU frequency, a quantity of CPUs that are enabled, a quantity of hardware threads, a cache size, a memory size, a power supply rating, a power supply model, a disk drive model, a network interface card (NIC) model, a quantity of NICs enabled in firmware, a network speed, a set of peripherals, a measured performance, a rated performance (e.g., a target load, actual load, average active power, or a power to performance ratio, among other examples), a benchmark test result (e.g., results of executing one or more computing tasks on a particular hardware type or configuration), a power characteristic, a performance characteristic, or a deployment type, among other examples. Energy consumption information may include, as described above, one or more parameters from which an energy consumption can be calculated, as described below. In some implementations, the energy management system 102 may access a set of different benchmarking data structures 106-1 to obtain hardware component information. For example, the energy management system 102 may communicate with the target computing system 104 to identify a first manufacturer of a first hardware component (e.g., a server) and a second manufacturer of a second hardware component (e.g., a NIC) and may access respective benchmarking data structures 106-1 for the first manufacturer and the second manufacturer to obtain information regarding the first hardware component and the second hardware component, respectively.

Figure 1B:
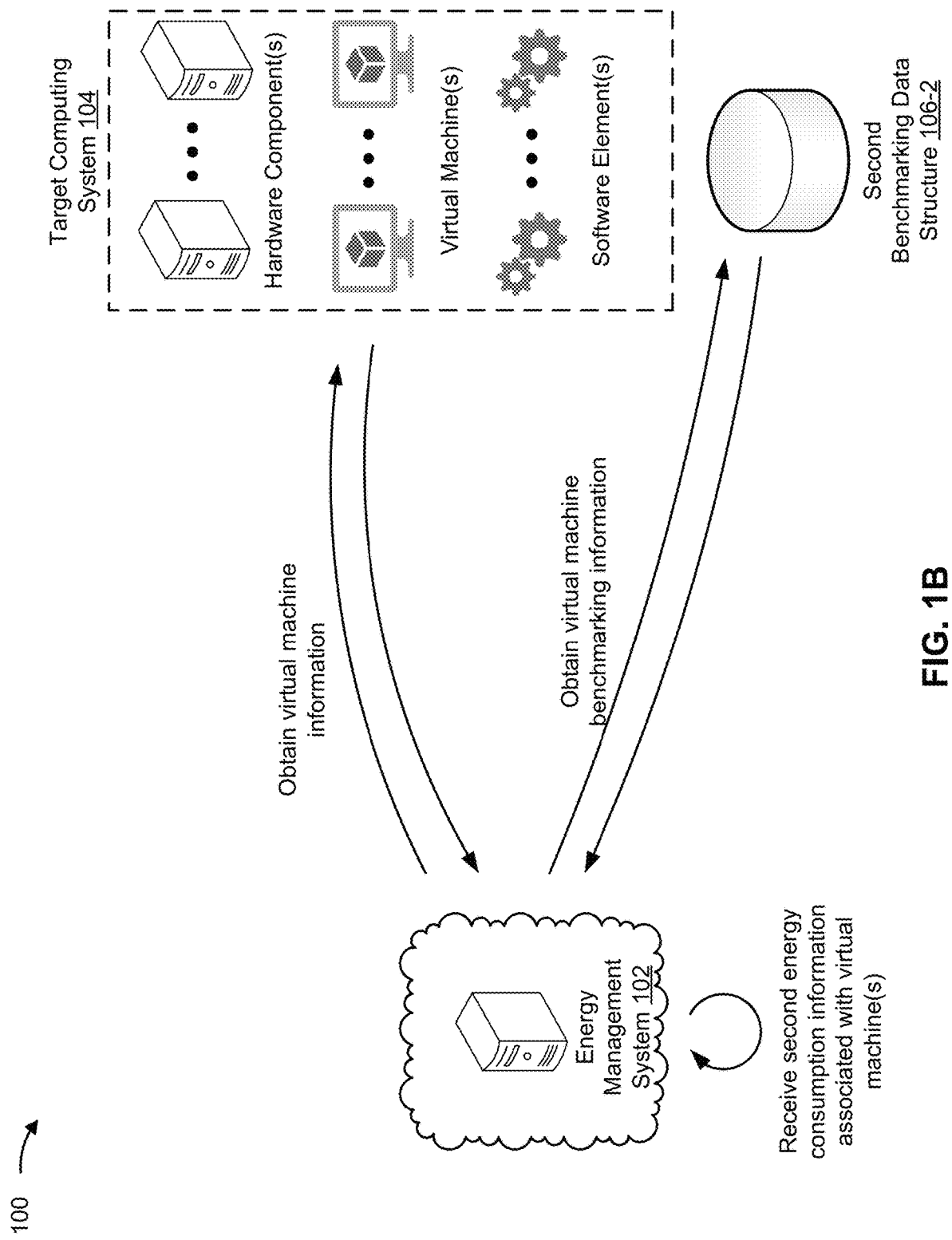

As shown in FIG. 1B, the energy management system 102 may receive second energy consumption information associated with a set of virtual machines of the target computing system 104. The second energy consumption information may not explicitly identify an energy consumption of the set of virtual machines. In this case, the second energy consumption information may include one or more parameter of the set of virtual machines, as described herein, from which the energy management system 102 can calculate the energy consumption of the set of virtual machines. For example, the energy management system 102 may obtain virtual machine information from the target computing system 104 and/or virtual machine benchmarking information from a second benchmarking data structure 106-1. The virtual machine information may include information identifying a set of virtual machines of the target computing system 104 and/or a set of parameters or configurations thereof. The virtual machine benchmarking information may include information regarding the set of virtual machines, such as an energy consumption associated with a virtual machine, a quantity of software elements that can be supported by a virtual machine, or a type of computing task that can be executed by a virtual machine, among other examples.

Figure 1C:
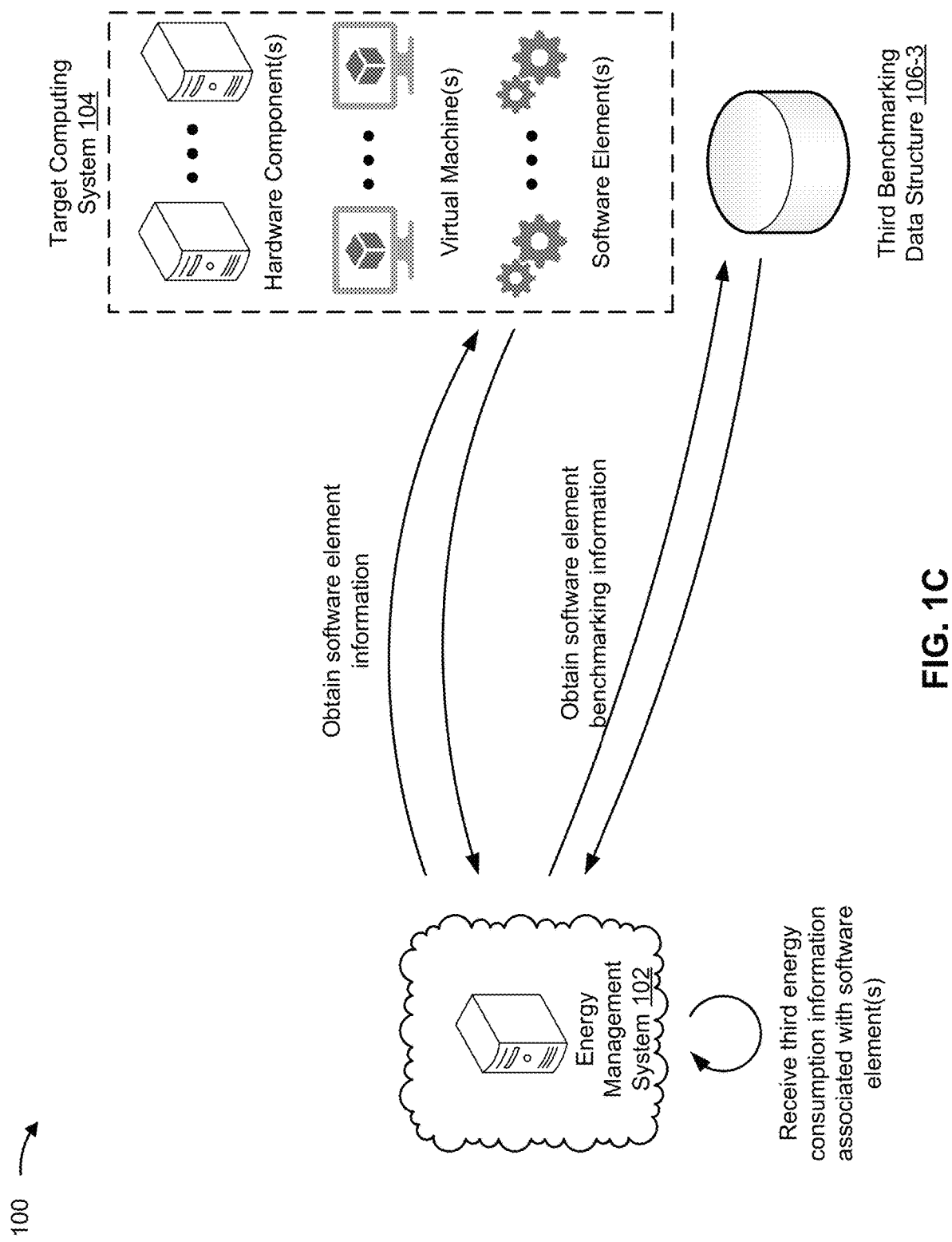

As shown in FIG. 1C, the energy management system 102 may receive third energy consumption information associated with a set of software elements of the target computing system 104. The second energy consumption information may not explicitly identify an energy consumption of the set of virtual machines. In this case, the second energy consumption information may include one or more parameter of the set of virtual machines, as described herein, from which the energy management system 102 can calculate the energy consumption of the set of virtual machines. For example, the energy management system 102 may obtain software element information from the target computing system 104 and/or software element benchmarking information from a third benchmarking data structure 106-3. The software element information may include information identifying a set of software elements of the target computing system 104 and/or a set of parameters or configurations thereof. The software element benchmarking information may include information regarding the set of software elements, such as an energy consumption of a software element, dependencies between software elements (e.g., hardware components, virtual machines, or other software elements that are to be available or operating in connection with a particular software element), or a type of computing task that can be executed by a software element, among other examples.

Figure 1D:
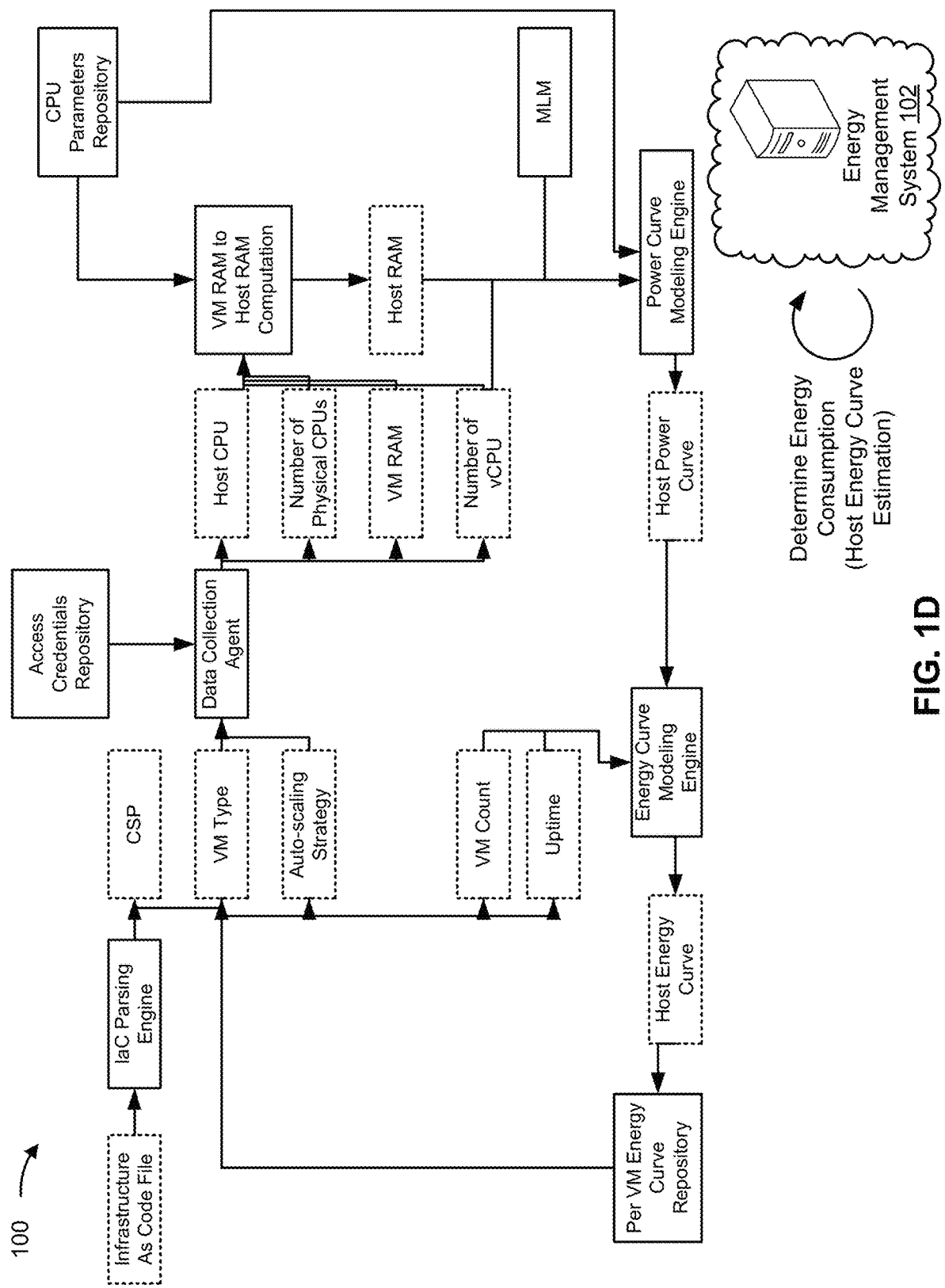

As shown in FIG. 1D, the energy management system 102 may determine an energy consumption for the target computing system 104. For example, the energy management system 102 may perform a host energy curve estimation procedure. In this case, the energy management system 102 may generate a model of energy utilization for the target computing system 104 based at least in part on the first, second, and third energy consumption information (e.g., a quantity of chips, a quantity of cores per chip, a quantity of threads per core, a CPU frequency, a cache value, a random access memory (RAM) amount). In some implementations, the energy management system 102 may generate a table of energy consumption values. For example, the energy management system 102 may use the model of energy utilization to generate an expected energy consumption at different performance levels and/or an error percentage (e.g., corresponding to a predicted standard deviation for the expected energy consumption at the different performance levels). One technique for generating the error percentage that the energy management system 102 may use is to generate an average confidence interval using a 10-fold cross validation technique averaged across a plurality of iterations and further averaged across a plurality of different models.

To generate a host energy curve estimate, the energy management system 102 may include a set of modules or functions (represented by solid lines), which may be used to process parameters or data elements (represented by dashed lines). For example, the energy management system 102 may use an infrastructure-as-code (IaC) parsing engine to parse an IaC file. The IaC file may be a representation of a set of parameters of, for example, a cloud computing environment associated with the target computing system 104. The energy management system 102 may pass a result of parsing the IaC file, as well as a cloud service provider (CSP) parameter, virtual machine (VM) type parameter, and/or an auto-scaling strategy parameter (e.g., a set of optimizations for scaling resources in, for example, a cloud computing environment) to a data collection agent. The data collection agent may be authorized to obtain the above-mentioned parameters based at least in part on using a set of access credentials associated with an access credentials repository. The energy management system 102 may use the data collection agent to generate, using the above-mentioned parameters, information identifying, for example, a host CPU, a quantity of physical CPUs, and/or a virtual machine RAM associated with the target computing system 104, which may be provided to a virtual machine RAM to host RAM computation engine. The energy management system 102 may use the virtual machine RAM to host RAM computation engine to determine a host RAM parameter for the target computing system 104.

The energy management system 102 may use a machine learning model, as described in more detail below, to process the above-mentioned parameters, including the host RAM parameter, a quantity of virtual CPUs (vCPUs), and/or a set of parameters associated with a CPU that is providing processing resources for the target computing system 104. The energy management system 102 may obtain the set of parameters associated with the CPU from a CPU parameters repository. The energy management system 102 may use a power curve modeling engine to execute the machine learning model (MLM) and generate a host power curve. The energy management system 102 may use the host power curve and a set of additional parameters, such as a quantity of virtual machines and/or an uptime for the target computing system 104 (e.g., obtained from a result of parsing the IaC file), to generate a host energy curve on a time scale (e.g., a per hour (of uptime or computing task completion) basis) using an energy curve modeling engine. The energy management system 102 may store the host energy curve in a per virtual machine (type) energy curve repository and may repeat the above-described process for each virtual machine type associated with the target computing system 104.

Figure 1E:
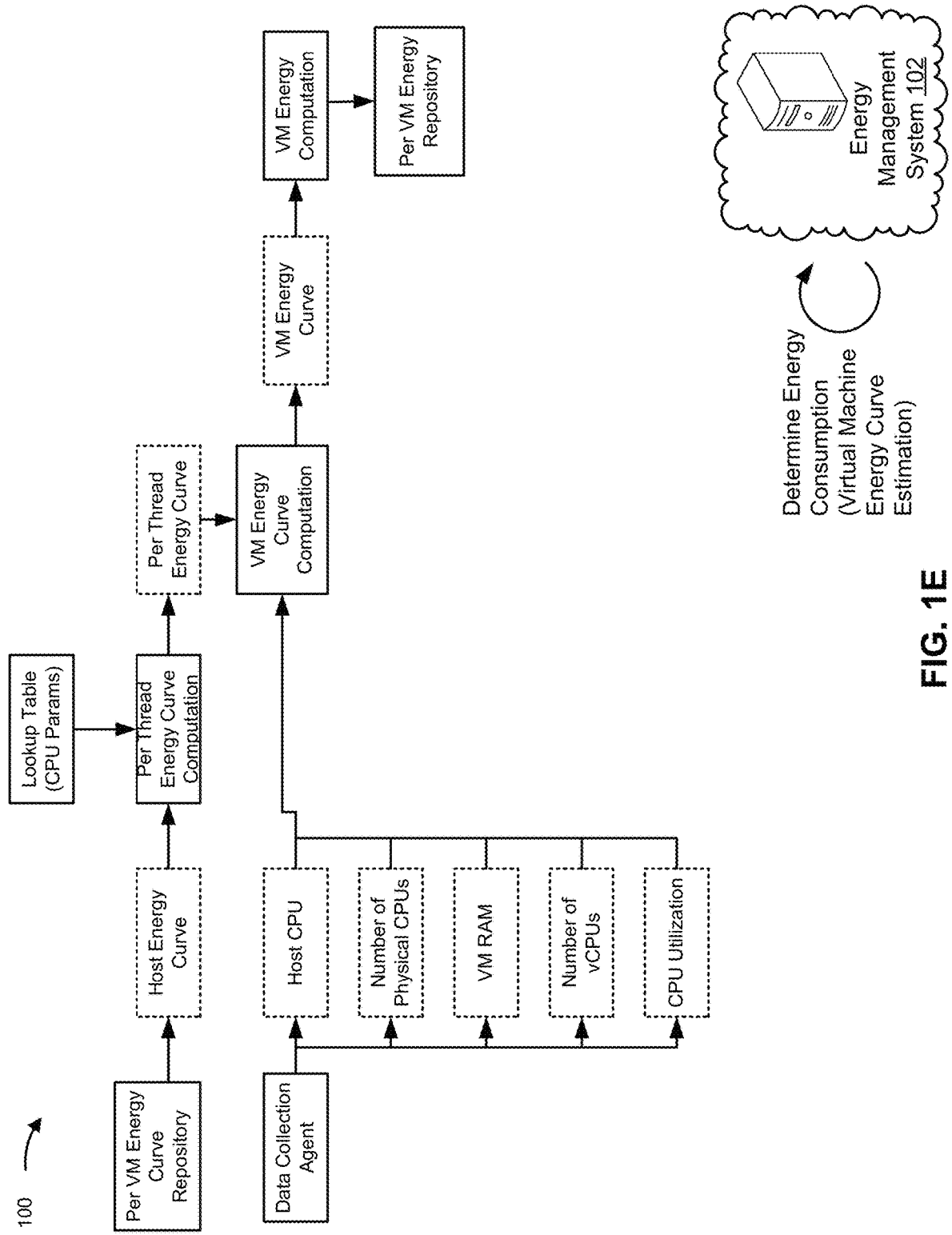

As shown in FIG. 1E, the energy management system 102 may determine the energy consumption for the target computing system 104. For example, the energy management system 102 may perform a virtual machine energy curve estimation procedure. In this case, the energy management system 102 may generate a model of energy utilization for the target computing system 104 based at least in part on the first, second, and third energy consumption information (e.g., a quantity of chips, a quantity of cores per chip, a quantity of threads per core, a CPU frequency, a cache value, or a RAM amount).

To estimate the virtual machine energy curve, the energy management system 102 may include a set of modules or functions (represented by solid lines), which may be used to process parameters or data elements (represented by dashed lines). For example, the energy management system 102 may obtain a host energy curve from the per virtual machine energy curve repository and compute a per thread energy curve using data from a lookup table of CPU parameters (e.g., identifying a quantity of threads being executed on a particular type of virtual machine associated with the host energy curve). Based on a result of the per thread energy curve computation, the energy management system 102 may obtain a per thread energy curve and compute a virtual machine energy curve. The virtual machine energy curve may be based on the per thread energy curve and a set of parameters obtained by a data collection agent for the energy management system 102, such as parameters representing a host CPU type, a quantity of physical CPUs, a virtual machine RAM, or a quantity of vCPUs, among other examples. The energy management system 102 may generate a virtual machine energy curve from the virtual machine energy curve computation and use the virtual machine energy curve in connection with a CPU utilization parameter to determine a virtual machine energy computation on a per virtual machine basis (e.g., per virtual machine type). The energy management system 102 may store the virtual machine energy computation in a per virtual machine energy repository and repeat the aforementioned process for each virtual machine type to generate virtual machine energy computation values for each virtual machine type.

Figure 1F:
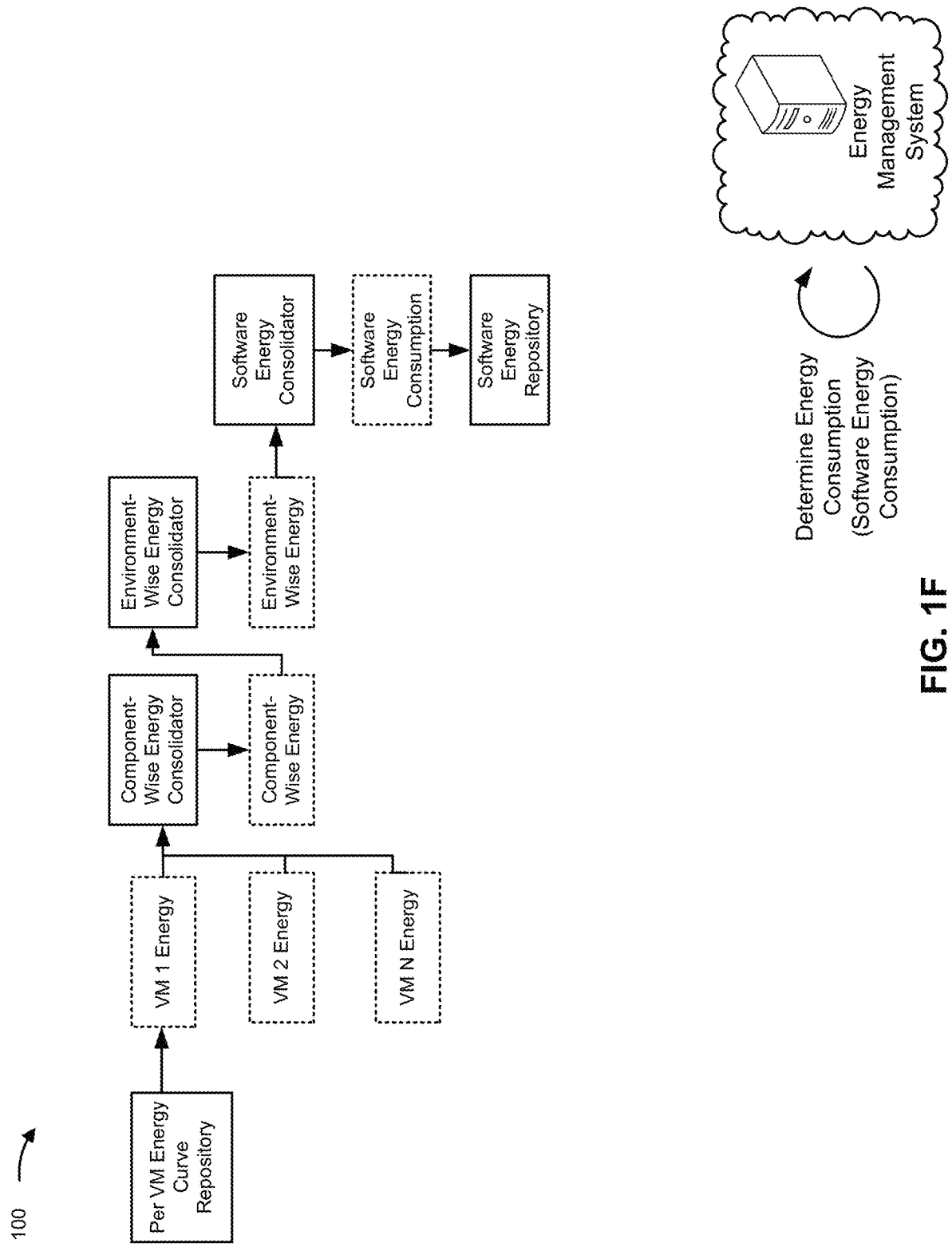

As shown in FIG. 1F, the energy management system 102 may determine the energy consumption for the target computing system 104. For example, the energy management system 102 may perform a software energy consumption determination procedure. In this case, the energy management system 102 may generate a model of energy utilization for the target computing system 104 based at least in part on the first, second, and third energy consumption information (e.g., a quantity of chips, a quantity of cores per chip, a quantity of threads per core, a CPU frequency, a cache value, or a RAM amount).

To estimate the virtual machine energy curve, the energy management system 102 may include a set of modules or functions (represented by solid lines), which may be used to process parameters or data elements (represented by dashed lines). For example, the energy management system 102 may use a component-wise energy consolidator to compute a component-wise energy from virtual machine energy computation values for each virtual machine type operating on each component of the target computing system 104. The energy management system 102 may use an environment-wise energy consolidator to determine an environment-wise energy based on the component-wise energy. The energy management system 102 may use a software energy consolidator to determine a software energy consumption based on the environment-wise energy consumption. The energy management system 102 may store the software energy consumption in a software energy repository on a per software element basis and repeat the above-mentioned process for each software element operating on the target computing system 104. In this way, the energy management system 102 may model energy consumption for the target computing system 104 based on hardware components, virtual machines, and software elements of the target computing system 104, thereby enabling optimization of energy consumption and/or digital twin generation (e.g., generation of a digital twin of the target computing system 104 for further modeling and/or monitoring).

Figure 1G:
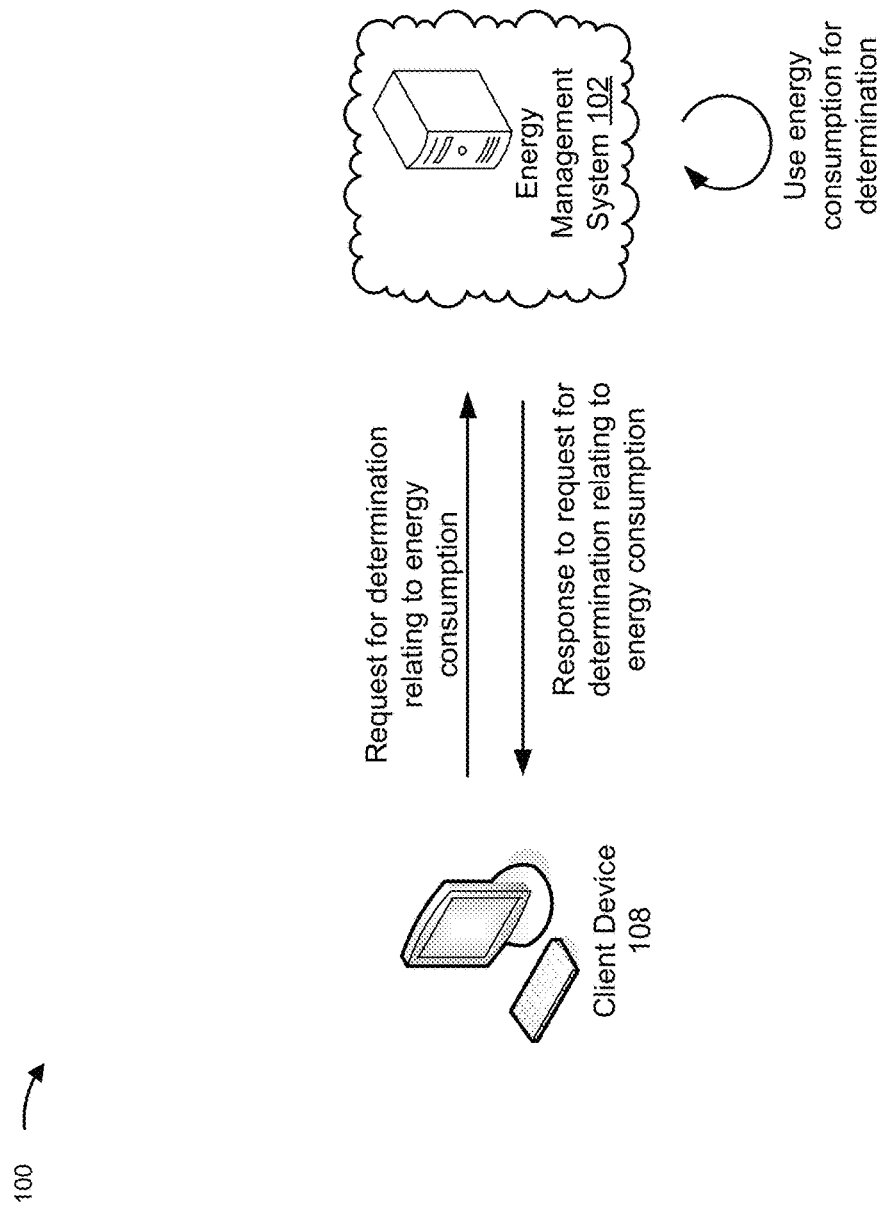

As shown in FIG. 1G, the energy management system 102 may receive a request for a determination relating to the energy consumption. For example, the client device 108 may transmit a request for benchmarking relating to the target computing system 104. In this case, the energy management system 102 may use the energy consumption information to perform the requested determination and may transmit a response to the client device 108. In some implementations, the energy management system 102 may identify an energy optimization for the target computing system 104. For example, the energy management system 102 may benchmark an energy consumption of the target computing system 104 based on modeling energy consumption for the target computing system 104, and may use the energy consumption to identify a change to a parameter to reduce the energy consumption.

Additionally, or alternatively, the energy management system 102 may select the target computing system 104 for a computing task as a response to the request for benchmarking. For example, the energy management system 102 may determine energy consumptions associated with a plurality of different computing systems (or a plurality of different parameter configurations for one or more computing systems), and may select the target computing system 104 and/or a parameter configuration for the target computing system 104. In this case, the target computing system 104 can complete the computing task using the parameter configuration with, for example, a lower carbon footprint compared with other computing systems or other parameter configurations.

In some implementations, the energy management system 102 may perform one or more automated actions as a response to the request for benchmarking. For example, the energy management system 102 may automatically assign a computing task to the target computing system 104 or schedule an order of task completion for a set of computing tasks to the target computing system 104 to optimize energy consumption associated with completing the computing task or set of computing tasks. As one example, the energy management system 102 may schedule high energy consumption computing tasks (or use of a high energy consumption target computing system 104) for an off-peak time (e.g., to reduce a cost associated with energy supply or to reduce a need for peaking power plant activation) and may schedule low energy consumption computing tasks (or use of a low energy consumption target computing system 104) for a peak time. Additionally, or alternatively, the energy management system 102 may use the energy consumption information to determine whether to assign one or more computing tasks to the target computing system 104, whether to have the one or more computing tasks completed concurrently or sequentially, or whether to assign a subset of resources of the target computing system 104 to the one or more computing tasks.

Additionally, or alternatively, the energy management system 102 may identify a carbon offset for a computing task based on a predicted energy consumption and associated carbon footprint. In this case, the energy management system 102 may automatically purchase or bid on the carbon offset in a carbon offset marketplace, thereby enabling carbon neutral computing for the target computing system 104. Additionally, or alternatively, the energy management system 102 may automatically turn the target computing system 104 on to complete the computing task and off when the energy management system 102 determines (e.g., based on monitoring) that the computing task is completed. In this way, the energy management system 102 avoids unnecessary energy consumption by the computing system.

Additionally, or alternatively, the energy management system 102 may migrate a workload or deployment based on the energy consumption information. For example, when the energy management system 102 is performing benchmarking for a usage context of a deployment migration or a workload migration, the energy management system 102 may determine a set of migration procedures to migrate the target computing system 104 (e.g., between cloud computing environments) or a computing task thereof to optimize energy consumption. Additionally, or alternatively, the energy management system 102 may recommend a change to a set of hardware components of the target computing system 104, based on identifying a particular hardware component as having a threshold contribution to energy consumption or being less than ideal in terms of energy consumption (e.g., another hardware component is available and is modeled to cause less energy consumption for the target computing system 104). Similarly, the energy management system 102 may recommend or automatically implement a change to a virtual machine or a software element.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
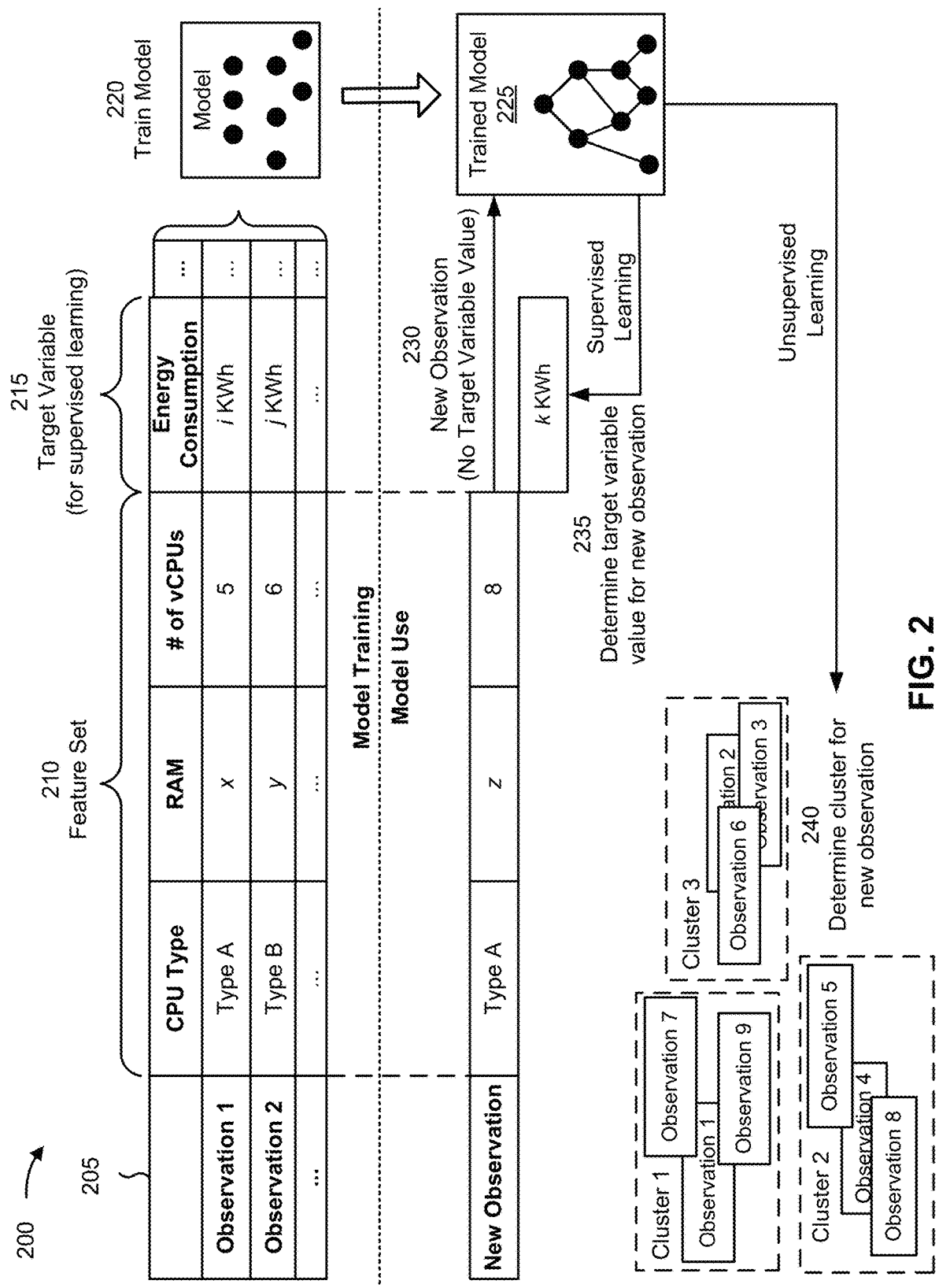
FIG. 2 is a diagram illustrating an example of training and using a machine learning model in connection with energy management for computing systems.

FIG. 2 is a diagram illustrating an example 200 of training and using a machine learning model in connection with energy management for computing systems. The machine learning model training and usage described herein may be performed using a machine learning system. The machine learning system may include or may be included in a computing device, a server, a cloud computing environment, or the like, such as the energy management system 301 described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from a set of target computing systems 330, as described elsewhere herein. In other words, the machine learning model may be trained, to generate a recommendation or to identify a scenario for a particular target computing system 330, based on data (e.g., recommendation data or scenario data) associated with the particular target computing system 330 and/or other target computing system 330.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from a set of target computing systems 330. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of a central processing unit (CPU) type, a second feature of an amount of RAM, a third feature of a quantity of virtual CPUs (vCPUs), and so on. As shown, for a first observation, the first feature may have a value of "Type A", the second feature may have a value of "x", the third feature may have a value of "5", and so on. These features and feature values are provided as examples, and may differ in other examples. For example, the feature set may include one or more of the following features: a hardware vendor, a model number, a form factor type, a set of CPU characteristics, a quantity of hardware threads, a cache size, a memory amount, a power supply rating, a power supply type, a disc drive type, a quantity of network cards, a firmware setting, a network speed, a set of peripherals, performance data, power usage data, energy cost data, energy source data, a set of computing tasks for completion, a set of scenarios observed across a time series, a set of recommendations provided and/or implemented, or a result of providing and/or implementing the set of recommendations, among other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is energy consumption, which has a value of "j KWh" (kilowatt-hours) for the first observation.

The feature set and target variable described above are provided as examples, and other examples may differ from what is described above. For example, for a target variable of a root cause of an energy spike, the feature set may include energy consumption values for a set of hardware components, software elements, or virtual machines; a set of configuration parameters for the set of hardware components, software elements, or virtual machines; or a set of previously identified energy spike root causes; among other examples. Similarly, for a target variable of a recommendation (e.g., of an order for completing computing tasks, a site location for a computing system, or a parameter setting for the computing system), the feature set may include one or more of the above-mentioned features, a set of previously provided recommendations, or a set of recommendation implementation results, among other examples.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. When using a decision tree algorithm, the machine learning system may train a machine learning model to analyze data associated with features to determine a decision regarding, for example, a source of an energy spike. Additionally, or alternatively, when using a support vector machine algorithm, the machine learning system may train a machine learning model to classify different observed scenarios into a particular type and to provide recommendations corresponding to the particular type. Additionally, or alternatively, when using a neural network algorithm, the machine learning system may train a machine learning model to analyze a set of computing tasks and determine an assignment of the computing tasks to one or more computing systems in a generated order to achieve a minimized carbon footprint or energy consumption. After training, the machine learning system may store the machine learning model as a trained machine learning model 225 to be used to analyze new observations.

As an example, the machine learning system may obtain training data for the set of observations based on monitoring a set of computing systems. In this case, the machine learning system obtains parameter sets for the set of computing systems and monitors energy consumption during completion of sets of computing tasks. This enables the machine learning system to train a model to identify effects (e.g., to energy consumption) of changes to different parameters that can be configured for different computing systems, as well as effects of different types of computing systems being used to complete different tasks in different orders.

As shown by reference number 230, the machine learning system may apply the trained machine learning model 225 to a new observation, such as by receiving a new observation and inputting the new observation to the trained machine learning model 225. As shown, the new observation may include a first feature of a CPU Type, a second feature of a RAM value, a third feature of a quantity of vCPUs, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of "k" KWh for the target variable of an energy consumption (e.g., to complete a computing task using a particular target computing system) for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, assigning the task to a particular computing system, ordering the task in a particular order, altering one or more parameters of the particular computing system (e.g., to optimize energy consumption), or purchasing carbon offsets in an amount equal to the predicted energy consumption, among other examples. The first automated action may include, for example, assigning the task to a particular computing system, ordering the task in a particular order, altering one or more parameters of the particular computing system (e.g., to optimize energy consumption), or purchasing carbon offsets in an amount equal to the predicted energy consumption, among other examples.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., the machine learning system classifies an observed energy consumption scenario into a cluster of energy spikes with a root cause of insufficient RAM being allocated for a computing task), then the machine learning system may provide a first recommendation, such as that additional RAM be allocated for the computing task. Additionally, or alternatively, the machine learning system may perform a first automated action and/or may cause a first automated action to be performed (e.g., by instructing another device to perform the automated action) based on classifying the new observation in the first cluster, such as automatically implementing the first recommendation described above.

As another example, if the machine learning system were to classify the new observation in a second cluster (e.g., the machine learning system classifies an observed energy consumption scenario into a cluster of energy spikes with a root cause of memory being allocated to already completed tasks), then the machine learning system may provide a second (e.g., different) recommendation (e.g., garbage collecting a memory to enable reallocation of existing memory resources to a computing task rather than increasing a memory allocation, which can cause excess energy usage) and/or may perform or cause performance of a second (e.g., different) automated action.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model). For example, the feedback information may include an observed result (e.g., an energy consumption) of implementing a recommendation.

In this way, the machine learning system may apply a rigorous and automated process to manage energy utilization by a computing system, such as a cloud computing system or an on-premises data center, among other examples. The machine learning system may enable recognition and/or identification of tens, hundreds, thousands, or millions of features and/or feature values for tens, hundreds, thousands, or millions of observations, thereby increasing accuracy and consistency and reducing delay associated with energy management relative to requiring computing resources to be allocated for tens, hundreds, or thousands of operators to manually identifying causes of energy utilization using the features or feature values. Moreover, by improving energy management for computing systems, an overall energy usage and carbon footprint are reduced for the computing systems.

As indicated above, FIG. 2 is provided as an example. Other examples may differ from what is described in connection with FIG. 2.

Figure 3:
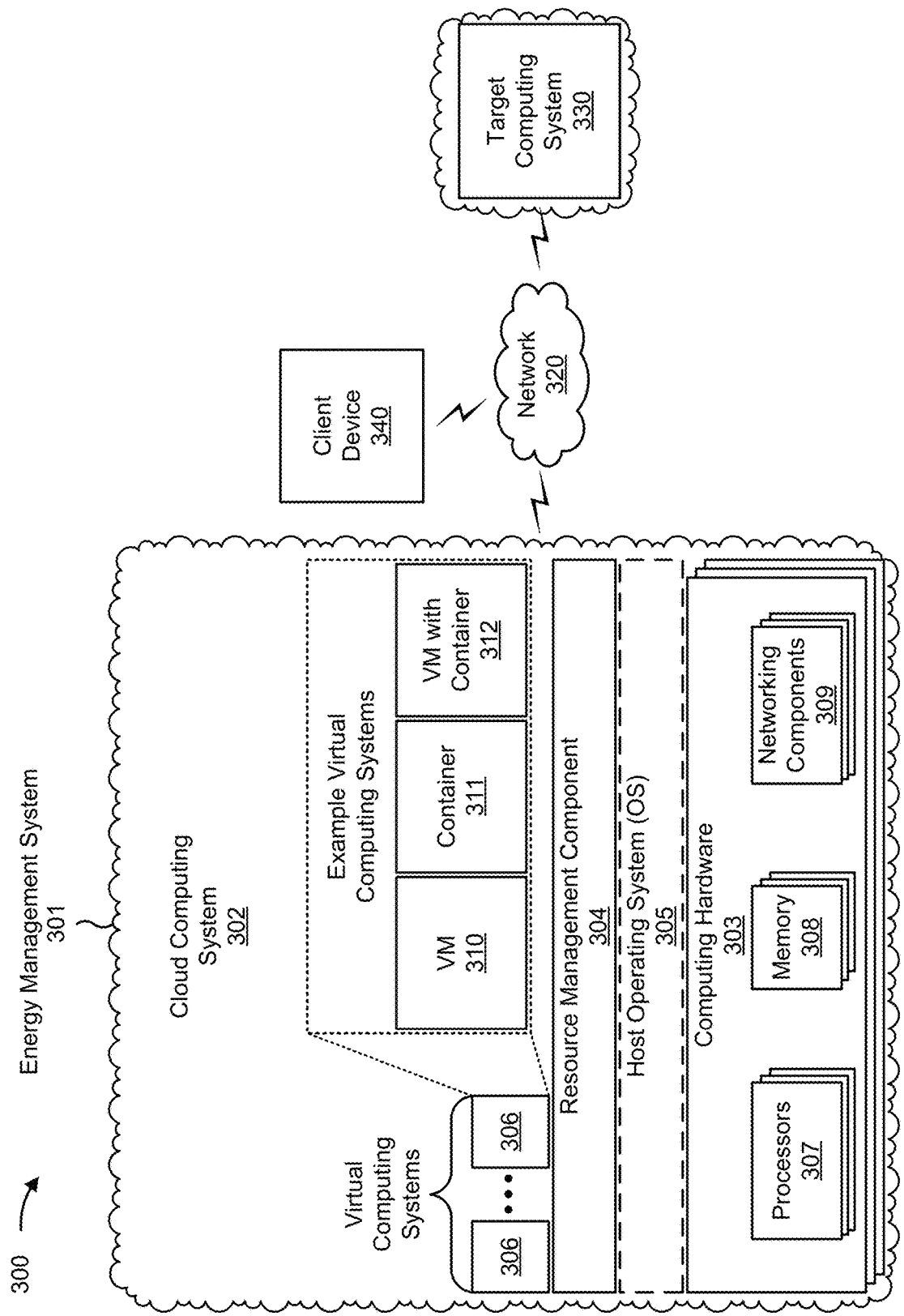
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include an energy management system 301, which may include one or more elements of and/or may execute within a cloud computing system 302. The cloud computing system 302 may include one or more elements 303-312, as described in more detail below. As further shown in FIG. 3, environment 300 may include a network 320, a target computing system 330, and/or a client device 340. Devices and/or elements of environment 300 may interconnect via wired connections and/or wireless connections.

The cloud computing system 302 may include computing hardware 303, a resource management component 304, a host operating system (OS) 305, and/or one or more virtual computing systems 306. The cloud computing system 302 may execute on, for example, an Amazon Web Services platform, a Microsoft Azure platform, a Google Cloud Platform, or a Snowflake platform, among other examples. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the energy management system 301 may include one or more elements 303-312 of the cloud computing system 302, may execute within the cloud computing system 302, and/or may be hosted within the cloud computing system 302. In some implementations, the energy management system 301 may not be cloud-based (e.g., may be implemented outside of a cloud computing system) or may be partially cloud-based. For example, the energy management system 301 may include one or more devices that are not part of the cloud computing system 302, such as device 400 of FIG. 4, which may include a standalone server or another type of computing device. The energy management system 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The target computing system 330 may include one or more elements of a cloud computing system, as described above, may execute within a cloud computing system, and/or may be hosted within a cloud computing system. In some implementations, the target computing system 330 may not be cloud-based (e.g., may be implemented outside of a cloud computing system, such as using an on-premises data center) or may be partially cloud-based. For example, the target computing system 330 may include one or more devices that are not part of a cloud computing system, such as device 400 of FIG. 4, which may include a standalone server or another type of computing device. The target computing system 330 may perform one or more operations and/or processes described in more detail elsewhere herein.

The client device 340 may include one or more devices capable of receiving, generating, storing, processing, and/or providing information associated with energy management for computing systems, as described elsewhere herein. The client device 340 may include a communication device and/or a computing device. For example, the client device 340 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
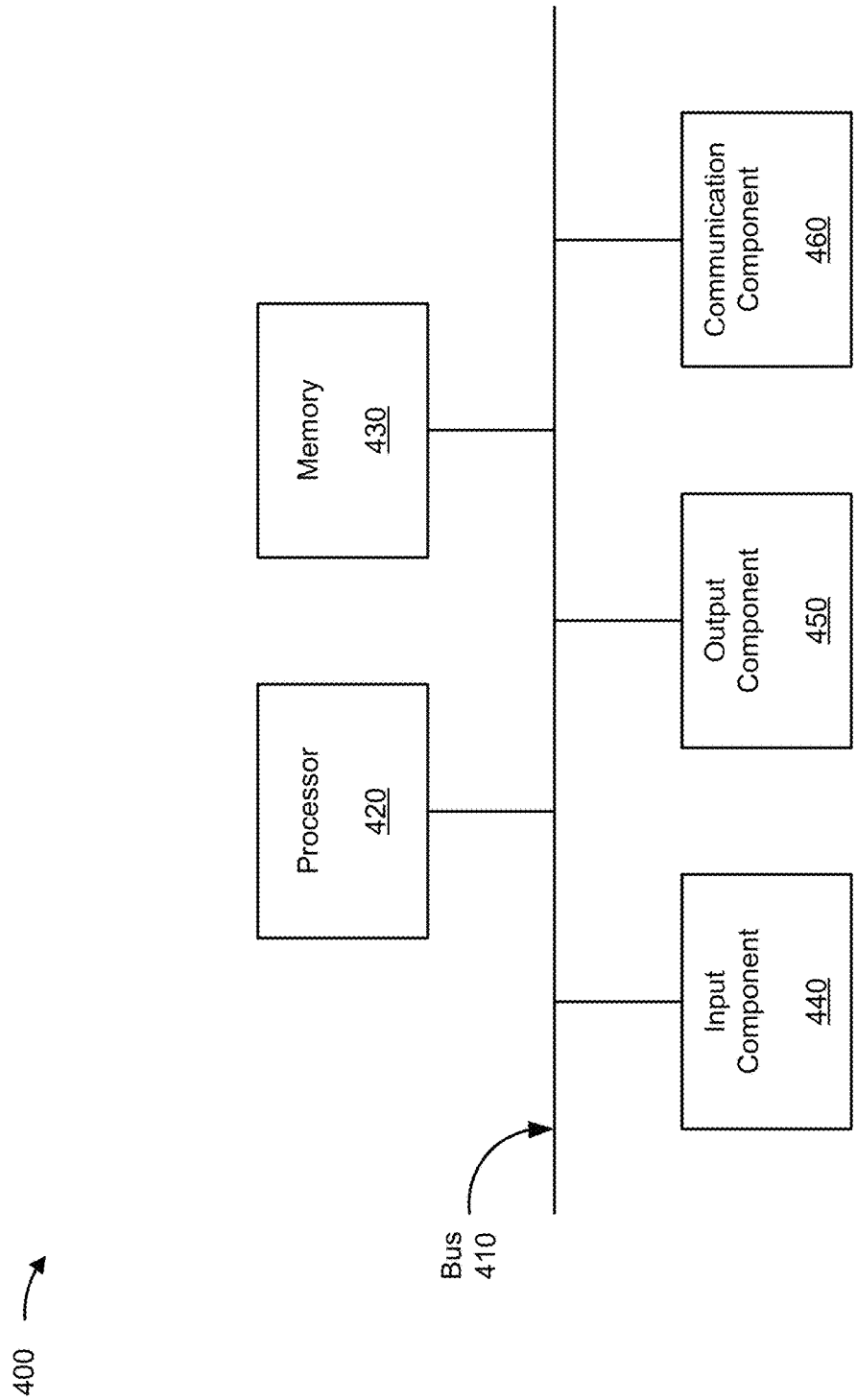
FIG. 4 is a diagram of example components of a device associated with energy management for computing systems.

FIG. 4 is a diagram of example components of a device 400 associated with energy management for computing systems. The device 400 may correspond to energy management system 301, target computing system 330, and/or the client device 340. In some implementations, energy management system 301, target computing system 330, and/or client device 340 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
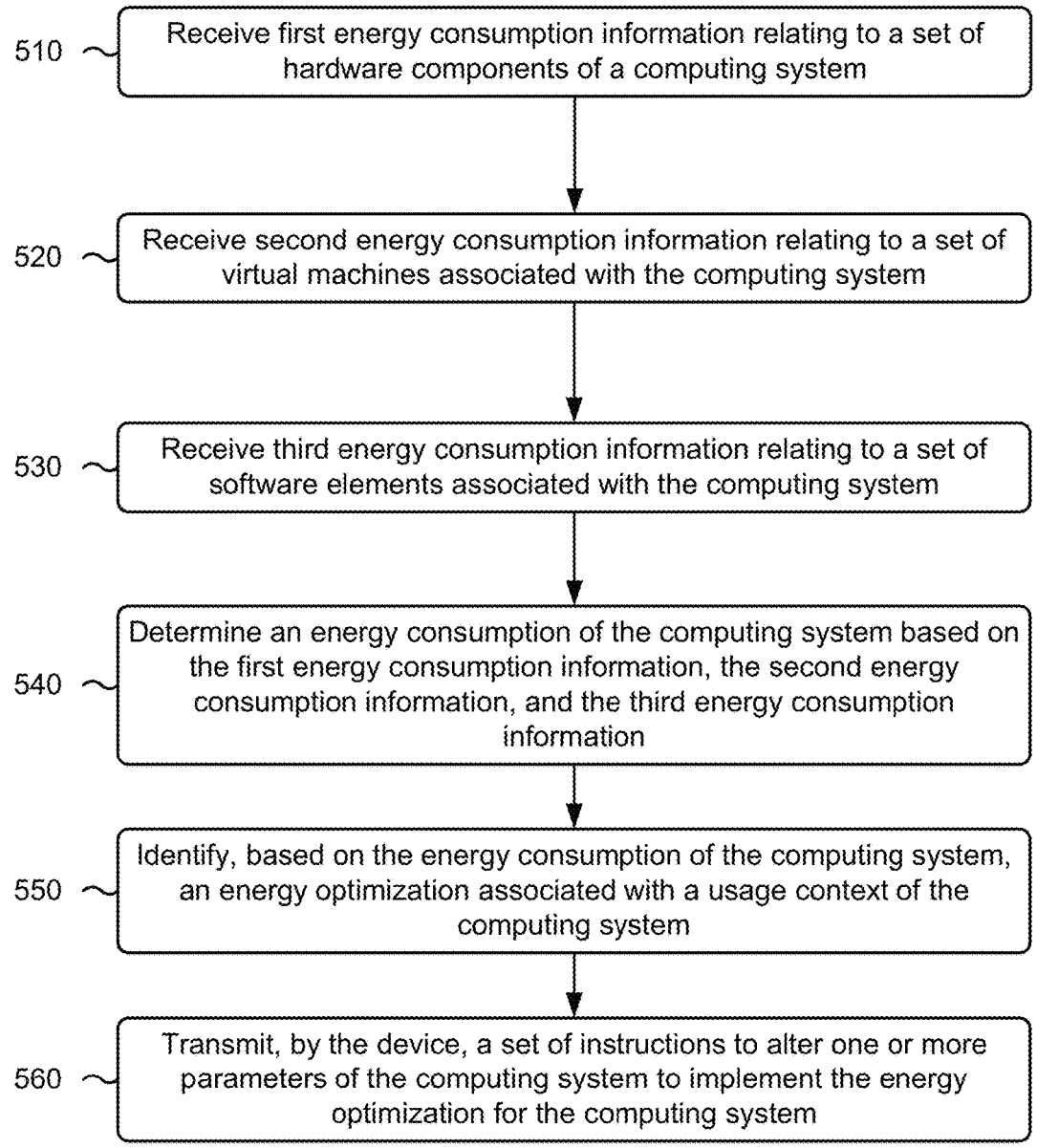
FIG. 5 is a flowchart of an example process associated with energy management for computing systems.

FIG. 5 is a flowchart of an example process 500 associated with energy management for computing systems. In some implementations, one or more process blocks of FIG. 5 are performed by an energy management system (e.g., energy management system 301). In some implementations, one or more process blocks of FIG. 5 are performed by another device or a group of devices separate from or including the energy management system, such as a target computing system (e.g., target computing system 330) and/or a client device (e.g., client device 340). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include receiving first energy consumption information relating to a set of hardware components of the computing system (block 510). For example, the energy management system may receive first energy consumption information associated with a computing system and relating to a set of hardware components of the computing system, as described above.

As further shown in FIG. 5, process 500 may include receiving second energy consumption relating to a set of virtual machines associated with the computing system (block 520). For example, the energy management system may receive second energy consumption information associated with the computing system and relating to a set of virtual machines associated with the computing system, as described above.

As further shown in FIG. 5, process 500 may include receiving third energy consumption information relating to a set of software elements associated with the computing system (block 530). For example, the energy management system may receive third energy consumption information associated with the computing system and relating to a set of software elements associated with the computing system, as described above.

As further shown in FIG. 5, process 500 may include determining an energy consumption of the computing system based on the first energy consumption information, the second energy consumption information, and the third energy consumption information (block 540). For example, the energy management system may determine an energy consumption of the computing system based on the first energy consumption information, the second energy consumption information, and the third energy consumption information, as described above.

As further shown in FIG. 5, process 500 may include identifying, based on the energy consumption of the computing system, an energy optimization associated with a usage context of the computing system (block 550). For example, the energy management system may identify, based on the energy consumption of the computing system, an energy optimization associated with a usage context of the computing system, as described above.

As further shown in FIG. 5, process 500 may include transmitting a set of instructions to alter one or more parameters of the computing system to implement the energy optimization for the computing system (block 560). For example, the energy management system may transmit a set of instructions to alter one or more parameters of the computing system to implement the energy optimization for the computing system, as described above.

Process 500 may include additional implementations, such as any single implementation or any combination of implementations described below and/or in connection with one or more other processes described elsewhere herein.

In a first implementation, the set of hardware components of the computing system includes a set of single servers or a set of multi-node servers.

In a second implementation, alone or in combination with the first implementation, receiving the first energy consumption information comprises communicating with a controller associated with the set of hardware components to determine a type of the set of hardware components, and communicating with a database storing energy consumption information for a plurality of types of hardware components to determine the first energy consumption information based on the type of the set of hardware components.

In a third implementation, alone or in combination with one or more of the first and second implementations, receiving the first energy consumption information comprises receiving one or more parameters associated with the set of hardware components.

In a fourth implementation, alone or in combination with one or more of the first through third implementations, process 500 includes identifying a model for analyzing the one or more parameters associated with the set of hardware components, and analyzing the one or more parameters associated with the set of hardware components using the model to determine an energy consumption associated with the set of hardware components.

In a fifth implementation, alone or in combination with one or more of the first through fourth implementations, receiving the second energy consumption information comprises receiving information identifying one or more parameters associated with the set of virtual machines, the one or more parameters associated with the set of virtual machines including information identifying an energy curve for the set of virtual machines, a quantity of computing threads for the set of virtual machines, or a quantity of virtual machines of the set of virtual machines.

In a sixth implementation, alone or in combination with one or more of the first through fifth implementations, process 500 includes calculating an energy consumption for the set of virtual machines based on the one or more parameters associated with the set of virtual machines.

In a seventh implementation, alone or in combination with one or more of the first through sixth implementations, receiving the third energy consumption information comprises receiving information identifying one or more parameters associated with the set of software elements, the one or more parameters associated with the set of software elements including information identifying the set of software elements, an energy usage of each software element of the set of software elements, an energy usage of an environment for executing each software element of the set of software elements, or a virtual machine energy usage associated with the set of software elements.

In an eighth implementation, alone or in combination with one or more of the first through seventh implementations, process 500 includes calculating an energy consumption for the set of software elements based on the one or more parameters associated with the set of software elements.

In a ninth implementation, alone or in combination with one or more of the first through eighth implementations, process 500 includes receiving a request to select a particular computing system, from a plurality of candidate computing systems, for a computing task, selecting the computing system, from the plurality of candidate computing systems, as the particular computing system for the computing task based on the energy consumption, and transmitting information identifying the selection of the computing system.

In a tenth implementation, alone or in combination with one or more of the first through ninth implementations, process 500 includes estimating, based on the energy consumption of the computing system, a carbon footprint for performing the computing task, and selecting the computing system comprises selecting the computing system based on the carbon footprint for performing the computing task.

In an eleventh implementation, alone or in combination with one or more of the first through tenth implementations, process 500 includes identifying a carbon offset for the computing task based on the carbon footprint, and communicating with a carbon offset transaction system to purchase the carbon offset.

In a twelfth implementation, alone or in combination with one or more of the first through eleventh implementations, process 500 includes communicating with a controller to turn on the computing system for the computing task, monitoring completion of the computing task, and communicating with the controller to turn off the computing system after completion of the computing task.

In a thirteenth implementation, alone or in combination with one or more of the first through twelfth implementations, process 500 includes ordering a set of computing tasks, the set of computing tasks including the computing task, for execution via the computing system based on respective energy consumptions of the set of computing tasks.

In a fourteenth implementation, alone or in combination with one or more of the first through thirteenth implementations, two or more computing tasks, of the set of computing tasks, are executed by the computing system concurrently.

In a fifteenth implementation, alone or in combination with one or more of the first through fourteenth implementations, process 500 includes identifying the usage context of the computing system, the usage context being a deployment migration or a workload migration, and identifying the energy optimization comprises determining a set of migration procedures based on the energy consumption of the computing system.

In a sixteenth implementation, alone or in combination with one or more of the first through fifteenth implementations, process 500 includes identifying the usage context of the computing system, the usage context being related to performance of one or more computing tasks, and identifying the energy optimization comprises altering, based on the energy consumption of the computing system, one or more components of the computing system.

In a seventeenth implementation, alone or in combination with one or more of the first through sixteenth implementations, the set of one or more components of the computing system includes at least one of a hardware component of the set of hardware components, a virtual machine of the set of virtual machines, or a software element of the set of software elements.

In an eighteenth implementation, alone or in combination with one or more of the first through seventeenth implementations, the set of one or more computing tasks includes at least one of a blockchain task, a token mining task, a streaming video task, a data center processing task, or a parallel computing task.

In a nineteenth implementation, alone or in combination with one or more of the first through eighteenth implementations, the computing system is a data center computing system or a cloud computing system.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    receiving, by a device, first energy consumption information associated with a computing system, the first energy consumption information relating to a set of hardware components of the computing system;
    receiving, by the device, second energy consumption information associated with the computing system, the second energy consumption information relating to a set of virtual machines associated with the computing system;
    receiving, by the device, third energy consumption information associated with the computing system, the third energy consumption information relating to a set of software elements associated with the computing system;
    determining, by the device, an energy consumption of the computing system based on the first energy consumption information, the second energy consumption information, and the third energy consumption information;
    identifying, by the device and based on the energy consumption of the computing system, an energy optimization associated with a usage context of the computing system; and
    transmitting, by the device, a set of instructions to alter one or more parameters of the computing system to implement the energy optimization for the computing system.

2. The method of claim 1, wherein the set of hardware components of the computing system includes a set of single servers or a set of multi-node servers.

3. The method of claim 1, wherein receiving the first energy consumption information comprises:
    communicating with a controller associated with the set of hardware components to determine a type of the set of hardware components; and communicating with a database storing energy consumption information for a plurality of types of hardware components to determine the first energy consumption information based on the type of the set of hardware components.

4. The method of claim 1, wherein receiving the first energy consumption information comprises:
receiving one or more parameters associated with the set of hardware components.

5. The method of claim 4, further comprising:
identifying a model for analyzing the one or more parameters associated with the set of hardware components; and
analyzing the one or more parameters associated with the set of hardware components using the model to determine an energy consumption associated with the set of hardware components.

6. The method of claim 1, wherein receiving the second energy consumption information comprises:
receiving information identifying one or more parameters associated with the set of virtual machines, the one or more parameters associated with the set of virtual machines including information identifying:
an energy curve for the set of virtual machines,
a quantity of computing threads for the set of virtual machines, or
a quantity of virtual machines of the set of virtual machines.

7. The method of claim 6, further comprising:
calculating an energy consumption for the set of virtual machines based on the one or more parameters associated with the set of virtual machines.

8. The method of claim 1, wherein receiving the third energy consumption information comprises:
receiving information identifying one or more parameters associated with the set of software elements, the one or more parameters associated with the set of software elements including information identifying:
the set of software elements,
an energy usage of each software element of the set of software elements,
an energy usage of an environment for executing each software element of the set of software elements, or
a virtual machine energy usage associated with the set of software elements.

9. The method of claim 8, wherein further comprising:
calculating an energy consumption for the set of software elements based on the one or more parameters associated with the set of software elements.

10. A device, comprising:
one or more memories; and
one or more processors, coupled to the one or more memories, configured to:
receive first energy consumption information associated with a computing system, the first energy consumption information relating to a set of hardware components of the computing system;
receive second energy consumption information associated with the computing system, the second energy consumption information relating to a set of virtual machines associated with the computing system;
receive third energy consumption information associated with the computing system, the third energy consumption information relating to a set of software elements associated with the computing system;
determine an energy consumption of the computing system based on the first energy consumption information, the second energy consumption information, and the third energy consumption information;
receive a request to select a particular computing system, from a plurality of candidate computing systems, for a computing task;
select the computing system, from the plurality of candidate computing systems, as the particular computing system for the computing task based on the energy consumption; and
transmit information identifying the selection of the computing system.

11. The device of claim 10, wherein the one or more processors are further configured to:
estimate, based on the energy consumption of the computing system, a carbon footprint for performing the computing task; and
wherein the one or more processors, to select the computing system, are configured to:
select the computing system based on the carbon footprint for performing the computing task.

12. The device of claim 11, wherein the one or more processors are further configured to: identify a carbon offset for the computing task based on the carbon footprint; and communicate with a carbon offset transaction system to purchase the carbon offset.

13. The device of claim 11, wherein the one or more processors are further configured to: communicate with a controller to turn on the computing system for the computing task; monitor completion of the computing task; and
communicate with the controller to turn off the computing system after completion of the computing task.

14. The device of claim 11, wherein the one or more processors are further configured to:
order a set of computing tasks, the set of computing tasks including the computing task, for execution via the computing system based on respective energy consumptions of the set of computing tasks.

15. The device of claim 14, wherein two or more computing tasks, of the set of computing tasks, are executed by the computing system concurrently.

16. A non-transitory computer-readable medium storing a set of instructions, the set of instructions comprising:
one or more instructions that, when executed by one or more processors of a device, cause the device to:
receive first energy consumption information associated with a computing system, the first energy consumption information relating to a set of hardware components of the computing system;
receive second energy consumption information associated with the computing system, the second energy consumption information relating to a set of virtual machines associated with the computing system;
receive third energy consumption information associated with the computing system, the third energy consumption information relating to a set of software elements associated with the computing system;
determine an energy consumption of the computing system based on the first energy consumption information, the second energy consumption information, and the third energy consumption information;
identify a usage context of the computing system;
identify, based on the energy consumption of the computing system, an energy optimization associated with the usage context of the computing system; and
transmit a set of instructions to alter one or more parameters of the computing system to implement the energy optimization for the computing system.

17. The non-transitory computer-readable medium of claim 16, wherein the usage context is a deployment migration or a workload migration; and
   wherein the one or more instructions, that cause the device to identify the energy optimization, cause the device to:
   determine a set of migration procedures based on the energy consumption of the computing system.

18. The non-transitory computer-readable medium of claim 16, wherein the usage context is related to performance of one or more computing tasks; and
   wherein the one or more instructions, that cause the device to identify the energy optimization, cause the device to:
   alter, based on the energy consumption of the computing system, one or more components of the computing system.

19. The non-transitory computer-readable medium of claim 18, wherein the one or more computing tasks includes at least one of:
   a blockchain task,
   a token mining task,
   a streaming video task,
   a data center processing task, or
   a parallel computing task.

20. The non-transitory computer-readable medium of claim 16, wherein the computing system is a data center computing system or a cloud computing system.

* * * * *